United States Patent Office 3,585,233
Patented June 15, 1971

3,585,233
PROCESS FOR THE PREPARATION OF
HYDROXYBENZONITRILES
Basil Jason Heywood, Hornchurch, England, assignor to
May & Baker Limited, Dagenham, Essex, England
No Drawing. Filed Sept. 19, 1968, Ser. No. 760,983
Claims priority, application Great Britain, Sept. 21, 1967,
43,107/67
Int. Cl. C07c *121/02*
U.S. Cl. 260—465F
11 Claims

ABSTRACT OF THE DISCLOSURE 4-hydroxybenzonitriles optionally substituted in the 3- and/or 5-positions by halogen, and alkali metal salts thereof, are prepared by demethylating corresponding 4-methoxybenzonitriles by reaction with an alkali metal compound of the Formula MA, wherein M represents sodium or potassium and A represents the cyano group or M represents lithium and A represents chlorine, at a temperature of at least 170° C. in a reaction medium consisting of at least one compound $RR_1NCOR_2$, wherein R represents $C_1$–$C_4$ alkyl, $R_1$ and $R_2$ each represent $C_1$–$C_4$ alkyl or together represent alkylene and form with the —N—CO— group a 4- or 5-membered saturated heterocyclic group (e.g. N-methylpyrrolidone), and optionally treating the alkali metal salt of the 4-hydroxybenzonitrile.

---

This invention relates to a process for the preparation of 4-hydroxybenzonitriles.

More especially, it relates to a process for the preparation of 4-hydroxybenzonitriles and salts thereof of the general formula:

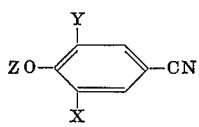

I wherein X and Y, which may be the same or different, each represent a hydrogen, chlorine, bromine or iodine atom, and Z represents a hydrogen, sodium, potassium or lithium atom. Preferably X and Y are the same and, more especially, each represents a hydrogen atom.

4-hydroxybenzonitriles of general Formula I are employed as herbicides or as intermediates for herbicides and other pesticides.

4-hydroxybenzonitriles of general Formula I have hitherto been prepared by:

(a) Decomposing p-trichloroacetiminophenol hydrochloride in the presence of sodium hydroxide with a yield of 25% [J. Houben and W. Fischer, Ber. 63, 2469 (1930)], (b) Applying Sandmeyer's reaction to 4-aminophenols and treating the diazonium chloride formed with cuprous cyanide [F. Ahrens, Ber. 20, 2953 (1887), A. Iakoubovitch et coll., J. Obchtchei Khim, 28 (90), 2294 (1958); J. N. Ashley et coll., J. Chem. Soc. 1942, 103], (c) Carrying out Rosenmund and Von Braun's reaction with p-bromophenol and copper cyanide in the presence of a tertiary base [W. N. White et coll., J. Amer. Chem. Soc. 80, 3271 (1958); U.S. Pat. No. 3,229,646], (d) The dehydration of 4-hydroxybenzaldoximes, for example by treatment with acetic anhydride and hydrolysis of the resulting 4-acetoxybenzonitriles as described by Auwers and Reis, Ber. 29 (2), 2355–2360 (1896).

All these processes have the disadvantage either that the starting materials used therein are difficult or expensive to obtain industrially or that the yields of 4-hydroxybenzonitriles which they give are of a low order. At best, the yields by the Sandmeyer reaction are of the order of 65–70%, but the diazotization step involved is always a difficult operation to carry out on an industrial scale. Often, to obtain a 4-hydroxybenzonitrile of satisfactory purity, these processes involve complicated and industrially inconvenient extraction procedures.

Very recently, improved processes for the preparation of 4-hydroxybenzonitrile itself and intermediates in its preparation have been described, for example:

(e) Heating anisic acid with a nitrile, the boiling point of which and of the corresponding acid are higher than that of anisonitrile, e.g. adiponitrile, and demethylating the anisonitrile obtained, as described in British patent specification No. 1,065,936, (f) Subjecting an alkyl ether of phenol having a nuclear alkyl substituent in the position para to the ether group, e.g. a 4-alkoxy-toluene, wherein the alkoxy group advantageously contains not more than 4 carbon atoms, such as 4-methoxytoluene or 4-ethoxytoluene, to the action of a mixture of oxygen and ammonia at a temperature between 300° and 600° C. in the presence of a catalyst based upon oxides of metals or metalloids, and dealkylating the 4-alkoxybenzonitrile, e.g. anisonitrile, obtained, as described in British patent specification No. 1,096,961, and (g) Conversion of 4-hydroxybenzaldoximes into 4-hydroxybenzonitriles by treatment with phosgene, as described in Belgian Pat. No. 684,697. This process shares with process (d) the disadvantage that the 4-hydroxybenzaldoximes used as starting materials are prepared from 4-hydroxybenzaldehydes, which are themselves expensive to prepare industrially.

The dealkylation step required to convert the 4-alkoxybenzonitriles obtained in the above processes (e) and (f) into 4-hydroxybenzonitrile has hitherto been carried out by a known procedure which consists of heating the 4-alkoxybenzonitrile with pyridine hydrochloride. This process has certain disadvantages in that a relatively large amount (at least equimolar in relation to the alkoxybenzonitrile) of a comparatively expensive material, pyridine, is required, which must be recovered if the process is to be economic, and the alkyl chloride produced is frequently unwanted.

As a result of research and experimentation, a new and advantageous method has been found for the demethylation of 4-methoxybenzonitriles of the general formula:

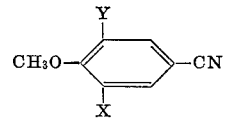

II wherein X and Y are as hereinbefore defined, to give 4-hydroxybenzonitriles of general Formula I. The new method avoids the use of pyridine hydrochloride and also possesses certain other advantages as hereinafter described.

According to the present invention, the demethylation of 4-methoxybenzonitriles of general Formula II to 4-hydroxybenzonitriles of general Formula I is effected by the reaction of the former with an alkali metal compound of the formula:

MA wherein M represents a sodium or potassium atom and A represents a cyano group, or M represents a lithium atom and A represents a chlorine atom, to give a benzonitrile of general formula:

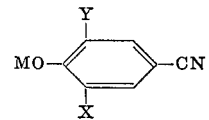

IV wherein M, X and Y are as hereinbefore defined, which may then be acidified to liberate the 4-hydroxybenzonitrile derivative of general Formula I wherein Z represents a hydrogen atom. The reaction between the 4-methoxybenzonitrile of Formula II and the alkali metal compound of Formula III is effected at a temperature of at least 170° C., and preferably of from 200° C. to 260° C., in a reaction medium consisting of at least one compound of the general formula:

$$RR_2NCOR_2 \quad V$$

wherein R represents an alkyl group containing from 1 to 4 carbon atoms, and $R_1$ and $R_2$, which may be the same or different, each represent an alkyl group containing from 1 to 4 carbon atoms, or together represent an alkylene group containing 2 or 3 carbon atoms which may be substituted by 1 or 2 methyl groups, and which, together with the —NCO-group to which they are attached, form a 4- or 5-membered, saturated nitrogen-containing heterocyclic group, if necessary at elevated pressure, for example when the reaction medium is one which boils at below 170° C. under normal atmospheric pressure or when it is desired to raise the boiling temperature of a medium which boils at 170° C. or above under normal atmospheric pressure. Preferably, the medium is, dimethylacetamide or, more particularly, N-methylpyrrolidone. Acidification of compounds of general Formula IV is preferably effected with a stong inorganic acid, e.g. hydrochloric acid.

The dealkylation of 4-methoxybenzonitriles of general Formula II by the process of the present invention generally gives rise to high yields, yields of 70% and above of 4-hydroxybenzonitriles of general Formula I usually being obtained.

The new demethylation process of the present invention is advantageous over the known pyridine hydrochloride procedure in that it is simpler, involving fewer and less difficult operations, the reaction mixture is less corrosive than the strongly acid pyridine hydrochloride and, if desired, the hydroxybenzonitrile product may be obtained directly in the form of the sodium, potassium or lithium salt, which may be directly converted into valuable chemicals, for example by treatment of the product of Formula I wherein X and Y both represent hydrogen atoms with dimethylphosphorothionyl chloride to give the insecticide O,O - dimethyl - O - (4-cyanophenyl) phosphorothionate, or by halogenation to give the herbicides 3,5 - diiodo - 4-hydroxybenzonitrile and 3,5 - dibromo - 4 - hydroxybenzonitrile, or their sodium, potassium or lithium salts.

According to a preferred aspect of the present invention, the alkali metal reactant of Formula III is that in which M represents a lithium atom and A represents a chlorine atom, i.e. lithium chloride.

In a particularly preferred aspect of the present invention, the reactant of Formula III is lithium chloride and the acidification of the compound of general Formula IV obtained, in which M represents a lithium atom, is effected with hydrochloric acid, whereby lithium chloride is readily recoverable and may be re-used in the dealkylation of compounds of general Formula II.

The following examples illustrate the new process of the present invention. Melting points were determined by the capillary tube method. Yields are expressed in terms of those which would be obtained by complete conversion of the 4-methoxybenzonitrile starting materials unless otherwise indicated.

EXAMPLE I

A solution of 4-methoxybenzonitrile (2.66 g.; 0.02 mole) and anhydrous lithium chloride (0.94 g.; 0.02 mole) in N-methylpyrrolidone (20 ml.) was refluxed for 24 hours in a 50 ml. flask. Heating was by means of an electric heating mantle. The solvent was removed by distillation under reduced pressure. The residual solid of crude lithium 4-cyanophenate was dissolved in water (50 ml.) and extracted with diethyl ether (2× 25 ml.). The combined ethereal extracts were evaporated to dryness, to give a yield of unchanged 4-methoxybenzonitrile (0.06 g.; 2.25% of starting quantity). The aqueous layer was purified by the addition of charcoal. The charcoal was removed by filtration and concentrated hydrochloric acid was added to the filtrate to pH 1. This was then extracted with diethyl ether (2× 25 ml.), and the combined ethereal extracts evaporated to dryness to give 4-hydroxybenzonitrile (2.3 g.; yield 96.8%), M.P. 101–103° C.

The aqueous layer contains lithium chloride which can be recovered by removal of the water by evaporation.

EXAMPLE II

A mixture of 4-methoxybenzonitrile (2.66 g.; 0.02 mole) and sodium cyanide (1.05 g.; 0.021 mole) was refluxed in N-methylpyrrolidone (20 ml.) for 24 hours. The solvent was removed by vacuum distillation and the residue of crude sodium 4-cyanophenate dissolved in water (20 ml.). The solution was washed with diethyl ether (2× 10 ml.) and acidified with concentrated hydrochloric acid to pH 1. The acidified solution was then extracted with diethyl ether (2× 10 ml.) and the combined ethereal extracts evaporated to dryness to give 4-hydroxybenzonitrile (2.16 g.; yield 91%), M.P. 106–107° C., which was recrystallised from benzene to give 4-hydroxybenzonitrile (1.87 g.; yield 78%), M.P. 110–112° C.

EXAMPLE III

A mixture of 4-methoxybenzonitrile (2.66 g.; 0.22 mole) and 85% potassium cyanide (1.36 g.; 0.021 mole) was refluxed in N-methylpyrrolidone (20 ml.) for 24 hours. The solvent was removed by distillation, the first few millilitres being collected and then redistilled. The fraction boiling at 80° C. was identified by infrared spectroscopy as acetonitrile. The residual solid was cooled to laboratory temperature and washed with petroleum ether (B.P. 40–60° C.; 2× 10 ml.). The solid residue of crude potassium 4-cyanophenate was dissolved in water (10 ml.), treated with charcoal and the filtered solution acidified with concentrated hydrochloric acid to pH 1. The precipitated solid was collected and dried to give 4-hydroxybenzonitrile (2.02 g.; yield 92%), M.P. 105–107° C., which was recrystallised from benzene to give 4-hydroxybenzonitrile (1.78 g.; yield 74%), M.P. 110–111° C.

EXAMPLE IV

A mixture of 4-methoxybenzonitrile (2.66 g.; 0.02 mole) and lithium chloride (0.94 g.; 0.02 mole) was refluxed in dimethylacetamide (20 ml.) for 24 hours. The dimethylacetamide was then removed by distilling off at atmospheric pressure and finally removing the last traces under reduced pressure (water pump). The residual solid of crude lithium 4-cyanophenate was dissolved in water (50 ml.) and extracted with diethyl ether (2× 25 ml.). The combined ethereal extracts were evaporated to dryness, to give a yield of unchanged 4-methoxybenzonitrile (0.14 g.; 5.2% of starting quantity). The aqueous layer was acidified with concentrated hydrochloric acid to pH 1 and then extracted with diethyl ether (2× 25 ml.). The combined ethereal extracts were dried over magnesium sulphate and evaporated to dryness to give 4-hydroxybenzonitrile (1.27 g.; yield 54.2%), M.P. 111–112° C.

The aqueous layer contains lithium chloride which can be recovered by removal of the water by evaporation.

EXAMPLE V

A mixture of 3,5-dichloro-4-methoxybenzonitrile (4.04 g.; 0.02 mole) and lithium chloride (0.94 g.; 0.02 mole) was refluxed in N-methylpyrrolidone (20 ml.) for 24 hours. The N-methylpyrrolidone was then removed by distilling off under reduced pressure (water pump). The residual solid of crude lithium 4-cyano-2,6-dichlorophenate was dissolved in water (50 ml.) and extracted with diethyl ether (2× 25 ml.). The combined ethereal extracts were evaporated to dryness to give a yield of unchanged 3,5-dichloro-4-methoxybenzonitrile (0.29 g.; 7.2% of starting quantity).

The aqueous layer was acidified with hydrochloric acid to pH 1 and then extracted with diethyl ether (2× 25 ml.). The combined ethereal extracts were dried over magnesium sulphate and evaporated to dryness to give 3,5-dichloro-4-hydroxybenzonitrile (3.43 g.; yield 91.1%), M.P. 139–141° C.

The aqueous layer contains lithium chloride which can be recovered by removal of the water by evaporation.

I claim:

1. Process for the preparation of a 4-hydroxybenzonitrile salt of the formula

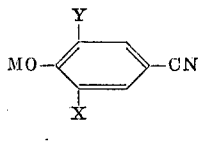

wherein X and Y each represent hydrogen, chlorine, bromine or iodine, and M represents sodium, potassium or lithium, which comprises the demethylation of a 4-methoxybenzonitrile of the formula

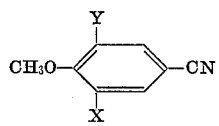

wherein X and Y are as hereinbefore defined, by reaction with an alkali metal compound of the formula MA, wherein M represents sodium or potassium and A represents the cyano group or M represents lithium and A represents chlorine, at a temperature of at least 170° C. in a reaction medium consisting of at least one compound of the formula:

$$RR_1NCOR_2$$

wherein R represents alkyl of from 1 through 4 carbon atoms, and $R_1$ and $R_2$, when taken singly, each represent alkyl of from 1 through 4 carbon atoms, or when taken together represent an alkylene group of 2 or 3 carbon atoms unsubstituted or substituted by 1 or 2 methyl groups, and which, together with the —NCO group to which they are attached, form a 4- or 5-membered, saturated nitrogen-containing heterocyclic group, to produce a salt of the formula

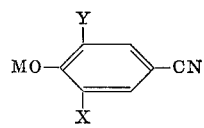

wherein M, X and Y are as hereinbefore defined.

2. Process according to claim 1 in which the reaction between the 4-methoxybenzonitrile and alkali metal compound is carried out at a temperature of from 200° C. to 260° C.

3. Process according to claim 1 in which the reaction medium is N-methylpyrrolidone.

4. Process according to claim 1 in which the reaction medium is dimethylacetamide.

5. Process according to claim 1 in which the alkali metal reactant is lithium chloride.

6. Process according to claim 1 in which the nitrile reactant is 4-methoxybenzonitrile.

7. Process according to claim 9 in which the free 4-hydroxybenzonitrile is liberated from the obtained alkali metal salt of the 4-hydroxybenzonitrile by treatment with a strong inorganic acid.

8. Process according to claim 7 in which the strong inorganic acid is hydrochloric acid.

9. Process according to claim 1, in which the said salt produced is acidified to liberate the corresponding 4-hydroxybenzonitrile.

10. Process according to claim 9 in which the 4-methoxybenzonitrile is reacted with lithium chloride and the resultant lithium salt of the 4-hydroxybenzonitrile product is treated with hydrochloric acid to yield the free 4-hydroxybenzonitrile.

11. Process according to claim 9 in which the 4-methoxybenzonitrile is reacted with lithium chloride at a temperature of from 200° C. to 260° C. in a reaction medium consisting of at least one compound selected from N-methylpyrrolidone, and dimethylacetamide, and the resultant lithium salt of the 4-hydroxybenzonitrile product is treated with hydrochloric acid to yield the free 4-hydroxybenzonitrile.

References Cited

UNITED STATES PATENTS

| | | | |
|---|---|---|---|
| 3,444,236 | 5/1969 | Nishizawa et al. | 260—465 |
| 3,457,293 | 7/1969 | Sonobe et al. | 260—465 |

CHARLES B. PARKER, Primary Examiner

C. F. WARREN, Assistant Examiner